Figure 10:
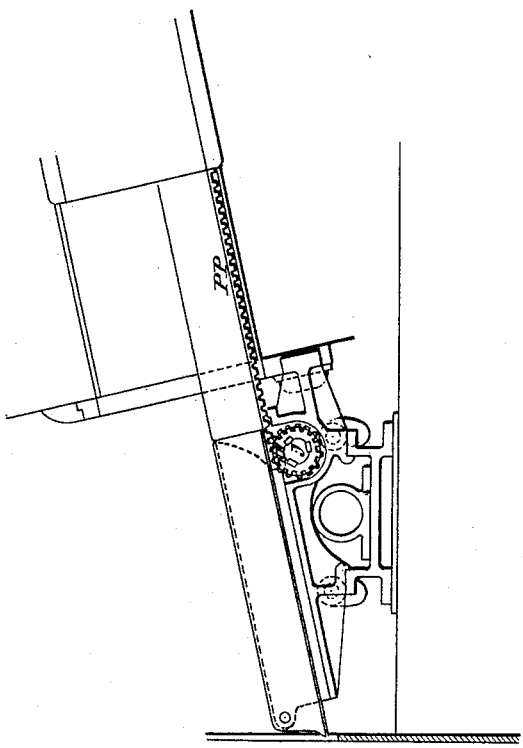

(No Model.) 5 Sheets—Sheet 1.
C. H. MURRAY.
HYDRAULIC OPERATING MECHANISM FOR BREECH LOADING ORDNANCE.
No. 377,904. Patented Feb. 14, 1888.
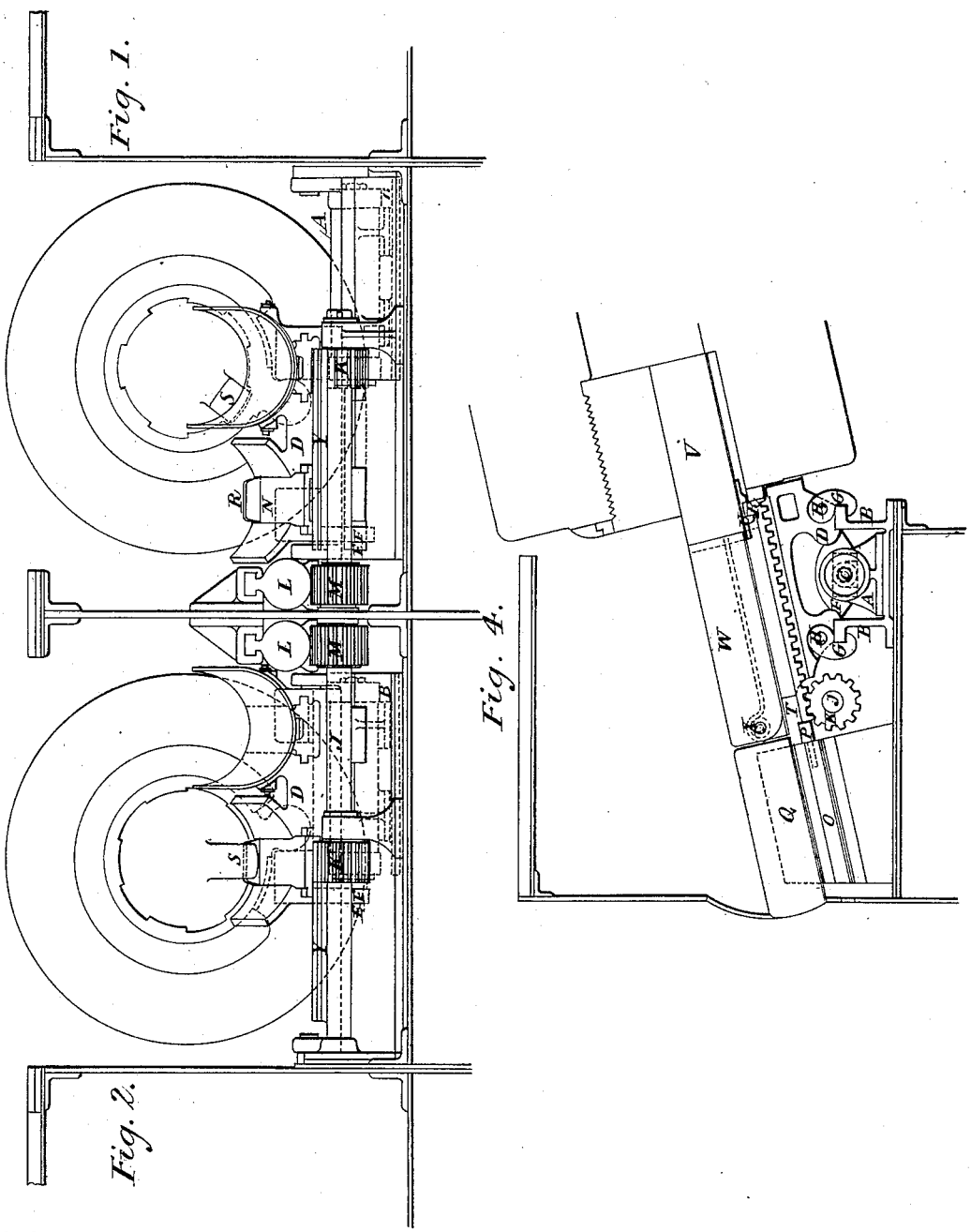
Witnesses
Baltus D. Long.
C. P. Elwell.
Inventor
C. H. Murray,
By Atty
Baldwin, Hopkins & Peyton.

(No Model.) 5 Sheets—Sheet 2.
C. H. MURRAY.
HYDRAULIC OPERATING MECHANISM FOR BREECH LOADING ORDNANCE.
No. 377,904. Patented Feb. 14, 1888.
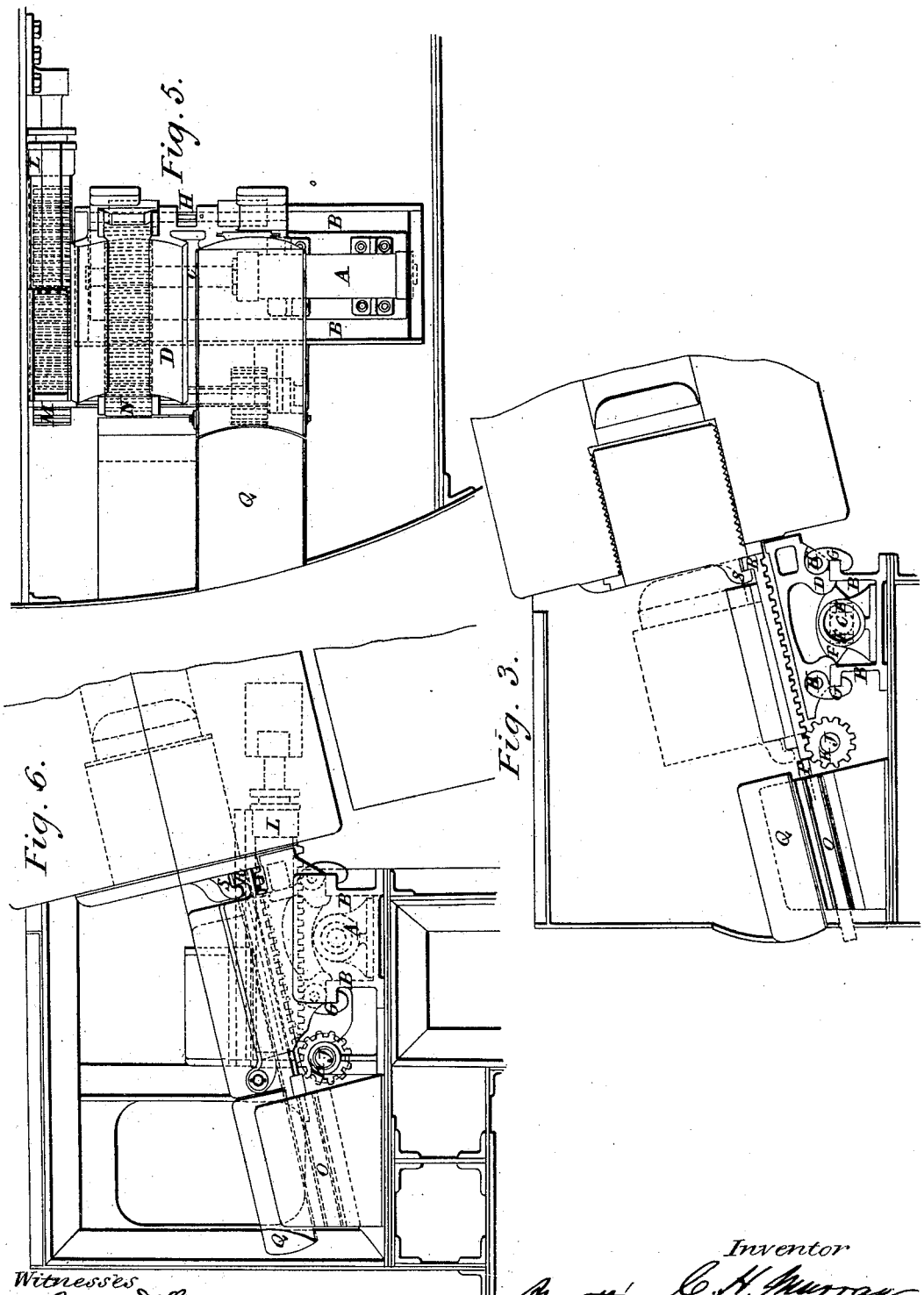
Witnesses
Battus D Long
C. P. Elwell
Inventor
C. H. Murray (No Model.) 5 Sheets—Sheet 3.
C. H. MURRAY.
HYDRAULIC OPERATING MECHANISM FOR BREECH LOADING ORDNANCE.
No. 377,904. Patented Feb. 14, 1888.
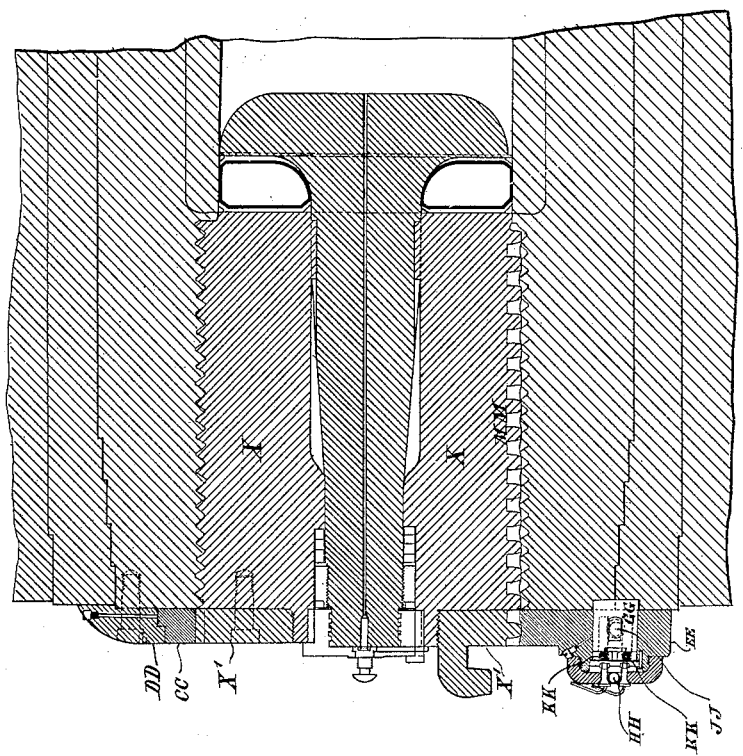
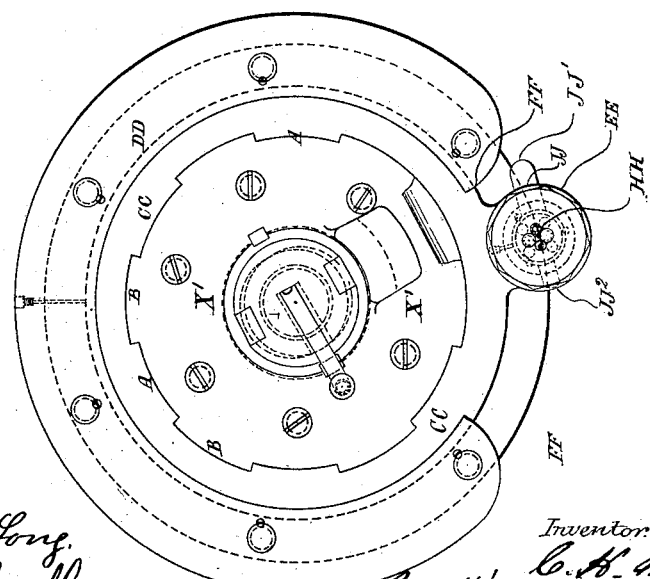

(No Model.)
5 Sheets—Sheet 4.

C. H. MURRAY.
HYDRAULIC OPERATING MECHANISM FOR BREECH LOADING ORDNANCE.

No. 377,904. Patented Feb. 14, 1888.

Witnesses
Inventor (No Model.) 5 Sheets—Sheet 5.
C. H. MURRAY.
HYDRAULIC OPERATING MECHANISM FOR BREECH LOADING ORDNANCE.
No. 377,904. Patented Feb. 14, 1888.
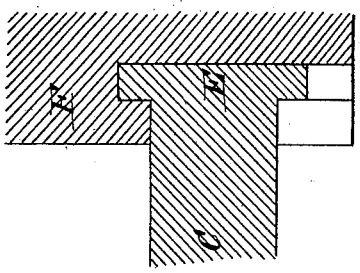
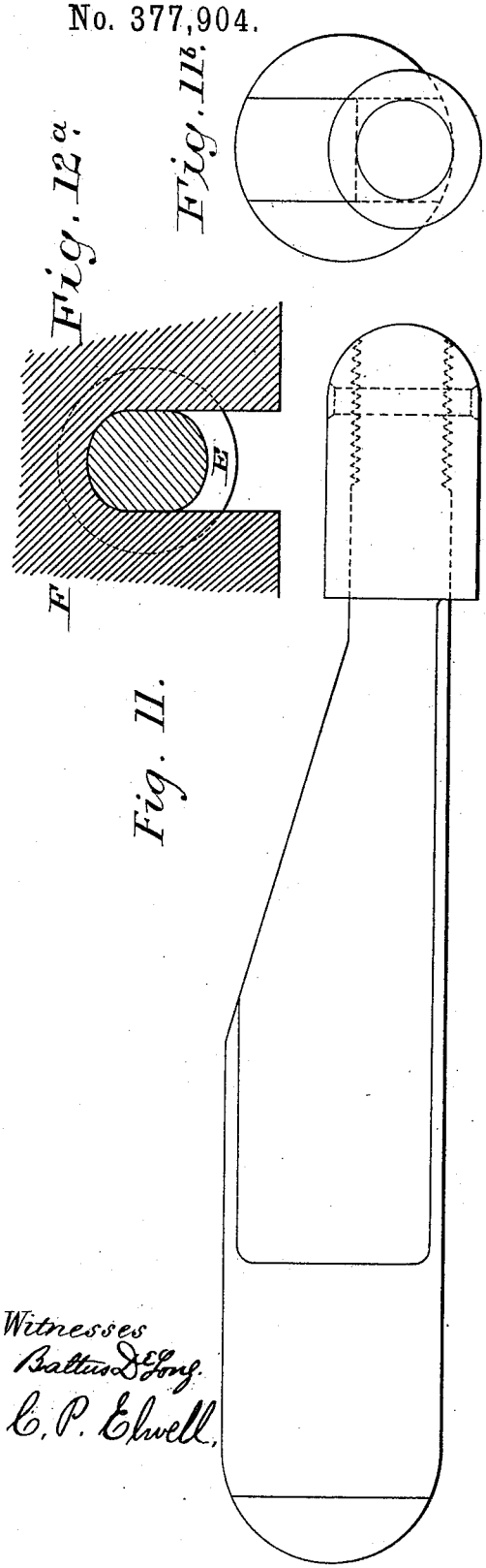
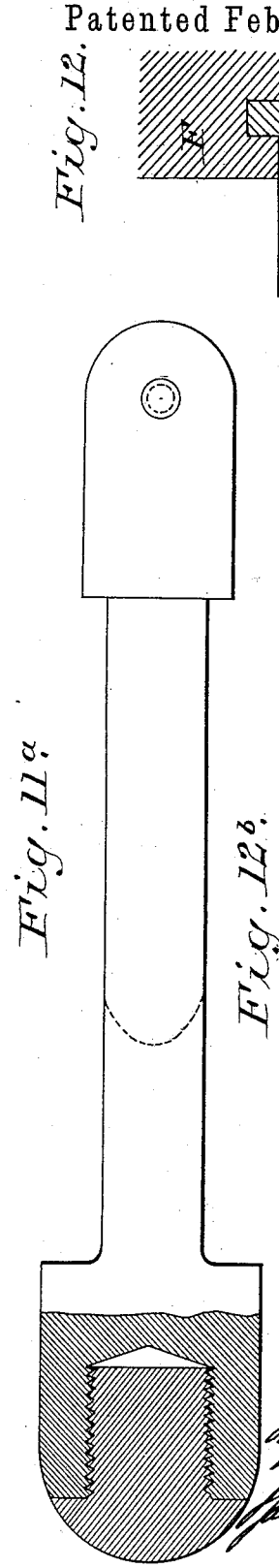
Witnesses
Baltus D. Long.
C. P. Elwell.
Inventor
C. H. Murray,
By Attys

UNITED STATES PATENT OFFICE.

CHARLES H. MURRAY, OF NEWCASTLE-UPON-TYNE, ENGLAND, ASSIGNOR TO W. G. ARMSTRONG, MITCHELL & CO., (LIMITED,) OF SAME PLACE.

HYDRAULIC OPERATING MECHANISM FOR BREECH-LOADING ORDNANCE.

SPECIFICATION forming part of Letters Patent No. 377,904, dated February 14, 1888.

Application filed June 9, 1887. Serial No. 240,767. (No model.) Patented in England September 16, 1885, No. 10,998.

*To all whom it may concern:*

Be it known that I, CHARLES HENRY MURRAY, a subject of the Queen of Great Britain, residing at The Elswick Works, Newcastle-upon-Tyne, England, engineer, have invented certain new and useful Improvements in Hydraulic Apparatus for Opening and Closing the Breeches of Heavy Guns, (for which a patent has been obtained in Great Britain, dated September 16, 1885, No. 10,998,) of which the following is a specification.

This invention relates, in part, to improvements on the apparatus described in United States Letters Patent No. 373,598, granted to my assignees November 22, 1887.

The purposes of the present invention are, first, reduction in the number of parts and consequent simplification of the machinery used for working the breech-screw; second, an arrangement by which it will be possible at any time to lift off the saddle and examine the hydraulic cylinder and pipes within the bed-plate; third, an improved method of arranging the sliding trays, the first of which is now made to slide from underneath the second, the second one being supported on a hinge with its axis at right angles to and above the center line of the trays, which admits of its being raised out of the way when required; fourth, a new method of turning the screw round in the gun by a ring fixed by a guide to the rear of the gun, this ring surrounding the breech-screw, which it engages by a series of notches corresponding in line with the cut-away portions of the divided screw; fifth, a new arrangement of locking-bolt to lock the breech-screw in the shut or safety position, this locking-bolt being contained in a toe or knob which depends from the lower edge of the ring surrounding the breech-screw, this toe or knob also serving as the striking-piece for turning the breech-screw; sixth, the breech end of the gun is so modified as to be comparatively free from small parts liable to be struck by machine-gun fire; seventh, a single shaft is used to drive up either the breech-screw or the loading-tray and to extract them; eighth, the same hydraulic cylinder performs either of the above operations, but cannot move both at once, nor can it move either if the troughs of the saddle are not correctly opposite the gun.

The saddle, as in my before-mentioned patented arrangement, is moved along a bed-plate horizontally and at right angles to the axis of the gun. The saddle by so moving unlocks the breech-block, receives the breech-block upon it when withdrawn from the gun, conveys it away, brings the loading-troughs into position, removes them when done with, brings back the breech-block, and when it has been replaced in the gun turns it to lock it in position.

Machinery constructed in accordance with my present invention is represented by the drawings annexed.

Figure 9:
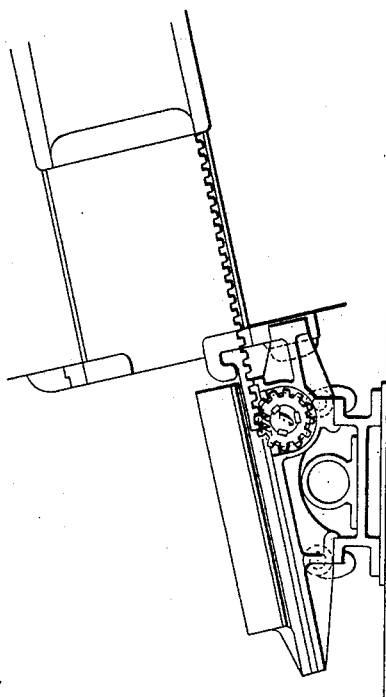

In the drawings, Figures 1 and 2 are rear elevations of a pair of guns with their breech-gear. In Fig. 1 the breech is closed and locked. In Fig. 2 the breech-screw is unlocked and ready to be withdrawn. Fig. 3 is a vertical section taken on the center line of the gun when the parts are in the position shown by Fig. 2. Fig. 4 is a vertical section taken on the center line of the gun when the breech is open and the loading-tray advanced. Fig. 5 is a plan with the parts in the same position as in Fig. 4, except that the breech of the gun and the front section of the loading-tray are omitted. Fig. 6 is a side elevation with the parts in the position they occupy just after closing or before opening the breech. Fig. 7 is a longitudinal and vertical section of the breech end of the gun and the breech-screw. Fig. 8 is a rear elevation of the same. Figs. 9 and 10 show a modification of the breech-gear. Fig. 9 is a longitudinal and vertical section at the center line of the gun. The breech-screw is unlocked. Fig. 10 is a like view with the breech-screw removed and the loading-tray advanced. Figs. 11, 11$^a$, and 11$^b$ are respectively a side view, an edge view, partly in section, and an end view of the wedge acting in connection with the safety locking-bolt. Figs. 12, 12$^a$, and 12$^b$ are respectively a longitudinal vertical section, a transverse vertical section, and a horizontal section, showing details of the connection between the saddle and the ram of its transverse cylinder.

A is the hydraulic traversing cylinder lying between the sides of the bed-plate B.

C is the ram working in the hydraulic traversing cylinder. It is connected to the saddle D by a cross-head, E, which hooks into a forked projection, F, on the under side of the saddle. This is done to facilitate the removal of the saddle D for the inspection or repair of the cylinder A or of the ram C. The saddle D is clipped onto the bed-plate B by clips G, four in number. These clips can be removed by turning a pin, H, which runs through them. These arrangements enable the saddle to be removed without undoing any nuts or bolts. Immediately behind the saddle and parallel to the bed on which it traverses, in rear of and transversely to the gun, is the main shaft J. The main shaft might be driven from any convenient position. A hydraulic cylinder, L, with a rack upon it engaging with a pinion, M, on the main shaft, is a convenient arrangement. This hydraulic cylinder L is placed horizontally, so that the packing and ram will be accessible, and is moved transversely to the path of movement of the saddle in well-known way.

To withdraw and return the breech-screw and the loading-tray, one rack, N, only is used, and this rack is driven by a pinion, K, on the main shaft J and slides transversely to the path of movement of the saddle. The rack N, in withdrawing the breech-screw or the loading-tray, travels out of its guideway in the saddle D and enters a long stationary pocket, O, under the third or rear section, Q, of the loading-tray. The rack thus becomes a sort of locking-bolt, preventing the traversing motion of the saddle from taking place while the withdrawing motion is going on; or if the traversing motion is begun first, then the lower end of the rack, running along a stop-bar, P, prevents the withdrawing motion from taking place while the traversing motion is going on. This occurs when the breech-screw is being revolved to lock it in the gun. When the motion of traversing is being made in order to remove the breech-screw to one side, then the rack N will be in the pocket O, and its turned-up end R, by which it engages with the parts which it moves, then slides free of the hook S on the breech-screw. The rack N in this case also becomes locked in position the moment the saddle D is traversed, because the fore end will then bear on the rear face of the saddle at T.

Going through all the operations necessary to first open the breech of the gun and then again close it, the action is as follows:

The parts are brought into position for loading, as shown by Fig. 1, the rack N being in its highest or advanced position. Then, First. The saddle D is traversed to the right to revolve the breech-screw by striking against a projection upon it. This projection is shown by dotted lines. At the same time the end R of the rack enters the hook S on the breech-screw, and thus becomes attached to the screw completely at the moment the screw is fully unlocked.

Second. The withdrawing-pinion K is worked by the main shaft J, and brings the rack N back into the pocket O, and thus brings the breech-screw out on the saddle D. This position is shown by dotted lines in Fig. 3.

Third. The saddle D is traversed to the left to remove the breech-screw and to bring the loading-tray into position for entering the gun. The rack N remaining in the pocket O, its end R is detached from the hook S on the breech-screw and becomes attached to a similar hook, U, on the rear part of the front section, V, of the loading-tray. While passing from one hook to the other the rack N cannot be moved, as it bears against the rear face of the saddle D at T.

Fourth. The main shaft J being rotated, the pinion K upon it then runs up the tray, the front section, V, of which enters the breech of the gun, sliding forward from under the middle section, W, of the tray, which is hung on a hinge, X, as previously stated. This position is shown by Fig. 4. The gun is now ready for loading, after which—

Fifth. The front section, V, of the loading-tray is withdrawn from the gun, the rack N entering the pocket O.

Sixth. The saddle D is traversed to bring the breech-screw opposite the gun, the rack N remaining in the pocket O, and its end bearing against the rear surface of the saddle at T, which prevents its being moved till the breech-screw is in line.

Seventh. The rack N is run up to put the breech-screw into the gun. The rack remains up to hold the screw until it is safely turned. This position is shown in full lines by Fig. 3. The saddle D is now traversed to revolve the breech-screw into the locked position. During this last operation the rack N remains in gear with its driving-pinion K, two teeth of which are prolonged for this reason along the shaft J, as shown at Y. The pinion cannot turn, because the lower end of the rack N is held against the stop-bar P.

The number of parts on the breech of the gun which are destructible by machine-gun fire is much reduced, and the rear of the gun is made as level and plain as possible in the following manner: As is shown by Figs. 7 and 8, the end plate, X', of the breech-screw X is made separate therefrom and securely attached thereto by screws or bolts, and notched out at A A to follow the line of the divided screw-thread, and the screw is turned round in the gun by the projections B B so formed, a ring, C C, closely fitting them. This inner ring is held to the gun by an overlapping outer ring or guide-plate, D D, fastened to the gun.

The toe or striking-piece E E, by which the breech-screw is revolved, is on the ring C C, and remains attached to the gun when the breech-block is withdrawn. Hence the deep channel which was before necessary for the passage of this toe through the saddle is no longer required. The stops which were used in former arrangements to limit the angle of revolution of the screw are no longer necessary, as the guide ring or plate is cut away instead of being a complete ring, and so formed at F F as to supply their place. The toe or striking-piece contains the safety locking-bolt G G, which locks the breech screw or block when the breech is closed.

The electric contact-gear H H, for preventing the electric primer from being fired before the gun is safe, is attached to and worked by the locking-bolt in the toe or striking-piece. The locking-bolt is withdrawn from its locked position by the wedge J J, which is struck at its end J J' by the saddle when it is traversed to unlock the breech-screw. Springs K K return this bolt to its locked position when the wedge-pin is struck at its end J J² by the saddle when it is traversed to lock the breech-screw. When the bolt is in, the electric contacts admit of the gun being fired; but when the bolt is not in place the gun cannot be fired by the electric primer.

It will be observed that the gun shown by Figs. 7 and 8, although similar to that represented by Figs. 1 and 2, is not identical with it. The one gun is right-handed and the other left.

In the gun represented in Figs. 7 and 8 the breech-block is locked for firing by thrusting the projection beneath the breech-block from left to right, whereas in Figs. 1 and 2 the opposite is the case. In Fig. 8 the block is shown in the closed position. The larger end of the wedge J J has been driven out by the thrust of the saddle against the other end, and the springs behind the locking-bolt G G have thrust it forward and caused it to engage and secure the breech-bolt. In unlocking the breech-block the thrust of the saddle upon the wedge will be in the direction from right to left. The bolt will then be withdrawn, and immediately after the breech-block itself will be rotated to disengage its screw-threads.

A modification of the above arrangement is proposed where the room is more confined than usual, whereby the rack N is very much shortened and contains only a few teeth. The rest of the teeth requisite are then cut on the under side of the breech-screw. The position of these teeth is shown at M M in Fig. 7. These teeth do not interfere with the threads of the screw, as they are cut on one of the portions where the "divided" thread is cut away. All the other parts belonging to the breech-screw and fitted to the rear of the gun remain the same as above described, except that the main shaft J, as shown in Figs. 9 and 10, is advanced to the front of the saddle.

There are two pinions, N N, which slide along this shaft and are driven by it—one to move the breech-screw and the other to move the loading-tray. These pinions are carried in the saddle and slide along the shaft, so that they are always engaged, each with its own rack. The first section, P P, of the loading-tray is fitted with a rack on the under side. The main shaft J is fitted with only one set of keys, which enter and drive whichever pinion is slid over them. These keys enter keyways in the saddle when they leave the pinions, so that the shaft cannot be revolved unless the troughs of the saddle are exactly in line with the gun.

Having now particularly described and ascertained the nature of my said invention and in what manner the same is to be performed, I declare that what I claim is—

1. In apparatus for opening and closing a gun-breech, the combination of the bed-plate, the saddle detachably connected with and traversing the bed-plate in rear of and transversely to the gun and acting upon the breech-block to turn it for locking and unlocking, and the hydraulic cylinder with its ram moving transversely to the gun for traversing the saddle with which said ram is detachably connected, substantially as and for the purpose set forth.

2. In apparatus for opening and closing a gun-breech, the combination of the bed-plate, the saddle traversing the bed-plate in rear of and transversely to the gun and acting upon the breech-block to turn it for locking and unlocking, the clips detachably connecting the saddle with the bed-plate, the saddle-traversing hydraulic cylinder on the bed-plate with its ram moving transversely to the gun, and the cross-head of the ram detachably engaged with the forked projection on the under side of the saddle, substantially as and for the purpose set forth.

3. In apparatus for opening and closing a gun-breech, the combination of the saddle moving transversely to the gun and in rear thereof, the rack hooked at its front end, having a guideway in the saddle acting upon the breech-block to turn it for locking and unlocking, and moving transversely to the path of movement of the saddle, the main shaft rotated intermittingly and in opposite directions in rear of and parallel to the saddle, the pinion on the main shaft engaging said rack, and the telescopic loading-tray carried by the saddle, with the front section of the tray sliding beneath the adjacent rear section thereof, and provided with a hook beneath its rear end for engagement with the rack-hook, substantially as and for the purpose set forth.

4. The combination of the gun provided with a breech-screw having the hook at its rear end, the saddle acting upon the breech-screw to turn it for locking and unlocking and moving transversely to and in rear of the gun, the rack hooked at its front end, having a guideway in the saddle and moving transversely to the path of movement of the saddle, the main shaft rotated intermittingly and in opposite directions in rear of and parallel to the saddle, the pinion on the main shaft engaging said rack, the telescopic loading-tray carried by the saddle, the front section of which tray slides beneath the adjacent rear section thereof and is provided with a hook beneath its rear end, the stationary rack-pocket beneath the rear of the loading-tray, and the locking devices for preventing inopportune actuation of the rack, substantially as and for the purpose set forth.

5. The combination of the gun provided with the breech-screw, the end plate secured to the breech-screw and having its periphery provided with projections and with notches coinciding with the divided thread of the breech-screw, the inner ring surrounding the end plate and having projections engaging the notches thereof, and also provided with the toe or striking-piece, and the outer ring or guide-plate secured to the gun, cut away for the passage of the striking-piece and overlapping the inner ring, substantially as and for the purpose set forth.

6. The combination of the gun provided with the locking-bolt recess, and having the breech-screw provided with the striking-piece, the safety locking-bolt moving endwise in the striking-piece, the spring (or springs) acting upon the locking-bolt to thrust it into its locking position in engagement with the rear recess in the gun, the wedge passing through the locking-bolt and striking-piece, and the saddle traversed transversely to and in rear of the gun and acting upon the wedge to move it endwise, substantially as and for the purpose set forth.

C. H. MURRAY.

Witnesses:
WM. JOHN GREY,
    *Notary Public.*
T. PURVIS.